No. 752,570. PATENTED FEB. 16, 1904.
W. J. LUTTRELL.
CULTIVATOR.
APPLICATION FILED MAY 5, 1903.
NO MODEL.
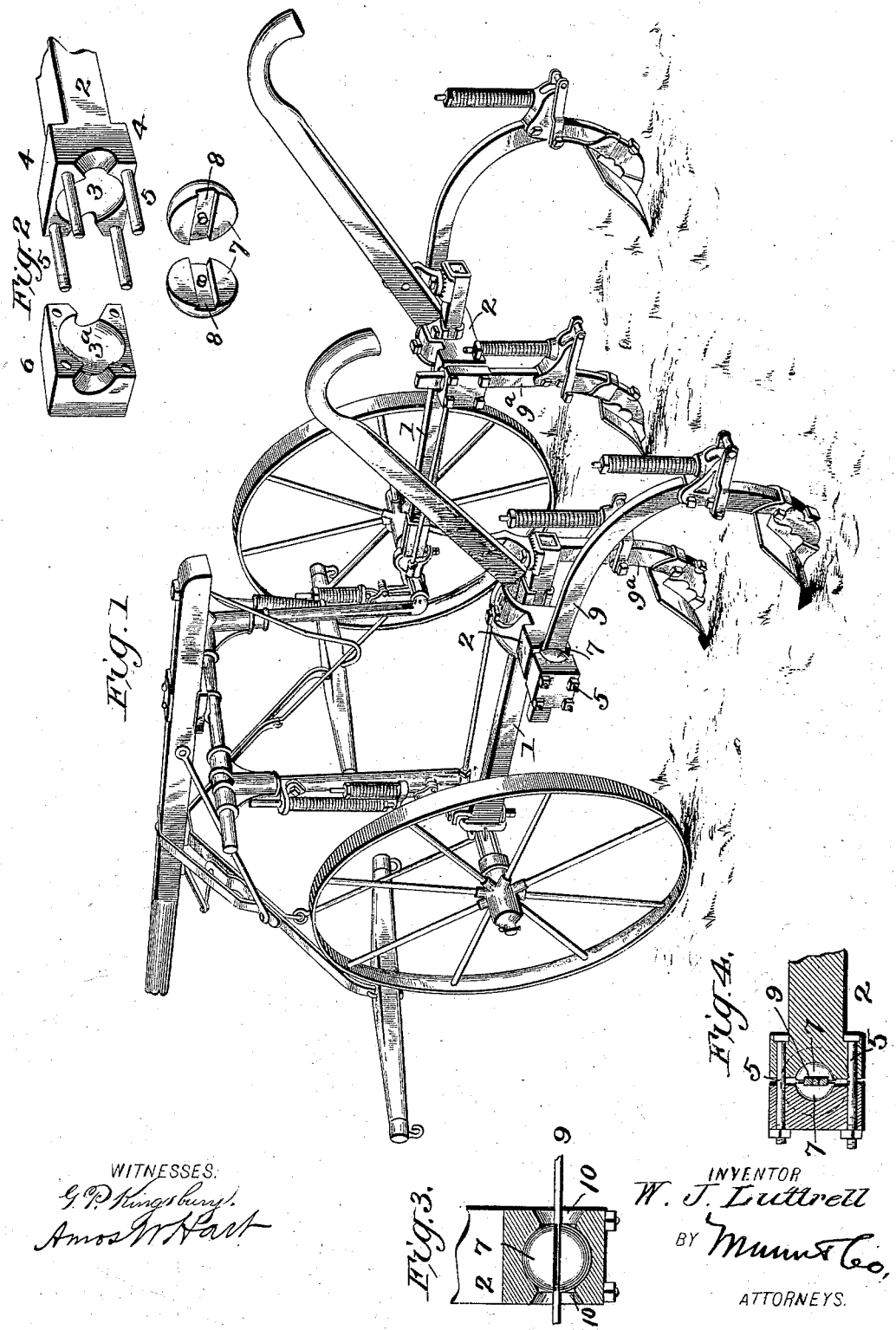
WITNESSES:
INVENTOR
W. J. Luttrell
BY Munn & Co.
ATTORNEYS.

No. 752,570. Patented February 16, 1904.

UNITED STATES PATENT OFFICE.

WILLIAM J. LUTTRELL, OF HONEYGROVE, TEXAS.

CULTIVATOR.

SPECIFICATION forming part of Letters Patent No. 752,570, dated February 16, 1904.

Application filed May 5, 1903. Serial No. 155,723. (No model.)

*To all whom it may concern:*

Be it known that I, WILLIAM J. LUTTRELL, a citizen of the United States, residing at Honeygrove, in the county of Fannin and State of Texas, have made certain new and useful Improvements in Cultivators, of which the following is a specification.

My invention is an improvement in that class of wheel-cultivators in which the shanks or foot-pieces carrying the shovels are attached to a saddle or cross-head on the draft-beam in such manner as to permit the said shanks or foot-pieces to be adjusted at different angles to the surface or to the line of draft.

My invention is embodied in the improved means for attaching the foot-piece to the saddle or cross-head, whereby it may be adjusted and clamped at any angle and with great facility.

The details of construction, arrangement, and combination of parts are as hereinafter described, reference being had to accompanying drawings, in which—

Figure 1 is a perspective view of a wheel-cultivator embodying my invention. Fig. 2 is a perspective view of the parts of the foot-piece clamp or coupling separated. Fig. 3 is a horizontal section of the portion of the saddle or cross-head, showing the spherical clamp in place. Fig. 4 is a vertical section of the saddle or cross-head with the spherical clamp in place.

1 indicates the rear draft-beams of the cultivator, which are so connected with the axle as to swing freely thereon. The "saddle" or cross-head 2 is applied to the beams 1 and secured in the usual or any suitable manner. The outer ends of the cross-head 2 (see Fig. 2) are extended vertically and their faces provided with a hemispherical socket 3 and with upper and lower flanges 4, through which screw-bolts 5 pass transversely. A rectangular block or end piece 6 is provided with a socket 3ª in its inner side which corresponds with the socket 3 of the cross-head proper. The block 6 is also provided with four transverse holes to receive the horizontal screw-bolts 5. The arrangement of the latter will be understood by reference to Fig. 4.

A spherical or ball clamp 7 is constructed of two like parts, each having a transverse groove 8 in its inner side or face. When the two members of the spherical clamp are placed together face to face, as indicated in Figs. 3 and 4, the slot formed by the coincident grooves 8 will receive the shank or foot-piece 9 of the cultivator, as illustrated. It will be noted, however, that the thickness of the shank 9 is slightly greater than the horizontal width of the slot, so that when the shank is in due position (see Fig. 4) the faces of the hemispherical members do not come in contact. The clamp 7 is also made of such dimension, or rather of such diameter, relative to the socket formed by parts 3 3ª that when in due position therein, as shown in Figs. 1, 3, and 4, the block 6 cannot come in contact with the vertical face of the cross-head 2, so that when the bolts 5 are tightened by turning up the nuts thereon the members of the clamp will be held firmly engaged with the shank or foot-piece 9. As shown in Fig. 4, the opposing faces of the two members of the spherical clamp are provided with a projection or lug located in the center of the grooves 8 for engagement with sockets or holes formed transversely in the shank or foot-piece 9 of the cultivator. As shown in Fig. 3, the said shank or foot-piece extends completely through the clamp 7 and beyond the cross-head 2. The spherical socket formed in the latter is provided with a flaring mouth 10 on each side, which construction permits the foot-piece 9 to be adjusted laterally or vertically to any desired angle.

By means of my improvement the plows or shovels may be set at any angle or pitch desired by merely loosening the nuts of the screw-bolts 5 and then tightening them again after the adjustment has been made, whereby the members of the spherical clamp will hold the foot-piece 9 by friction firmly in the position in which it is set. The foot-piece 9 may thus be so set as to adapt the shovel to be used on a rounding bed or curved surface, since the shovel will strike the soil in the same manner as the ordinary cultivator when plowing on level ground. By the means of this ball-clamp any abnormal bend or twist of the foot-piece may be counteracted or practically corrected and the shovel or plow given the desired "set" laterally or vertically.

On the inner sides of the beams 1 the cross-heads 2 are provided with a socket such as has been described, save that the mouths of the socket are directed upward and downward in order to accommodate a vertical shank or foot-piece 9ª, as shown in Fig. 1. It is apparent that the latter may be adjusted vertically, laterally, or forward and back at any required angle in the same manner as before described with reference to the horizontal foot-piece 9.

Having thus described my invention, what I claim as new, and desire to secure by Letters Patent, is—

1. In a cultivator, the combination, with the draft-beam, of the shovel or plow having a shank provided with transverse holes, a cross-head secured on said draft-beam, and having its outer ends provided with a hemispherical socket and extended vertically to form flanges which are provided with transverse holes, screw-bolts passing through said flanges, a block having a socket in its inner face and holes for receiving said bolts, and a spherical clamp formed of two like hemispherical members having their flat faces provided with coincident grooves and a projection located in the center of the latter, all constructed and arranged as shown and described.

2. In a cultivator, the combination, with a draft-beam, of a cross-head secured thereon and having a hemispherical socket in its outer end which is extended vertically at top and bottom and provided with transverse holes, a block having a corresponding socket in its inner faces, screw-bolts passing through the said flanges and block, and a spherical clamp formed of two like parts having coincident grooves in their flat faces, the same being adapted to be held in the sockets of the cross-head and block and be clamped therein, said cross-head being beveled on the front and rear sides and thus provided with flaring mouths, as and for the purpose specified.

WILLIAM J. LUTTRELL.

Witnesses:
GEO. W. MORGAN,
W. H. GROSS.